July 3, 1962

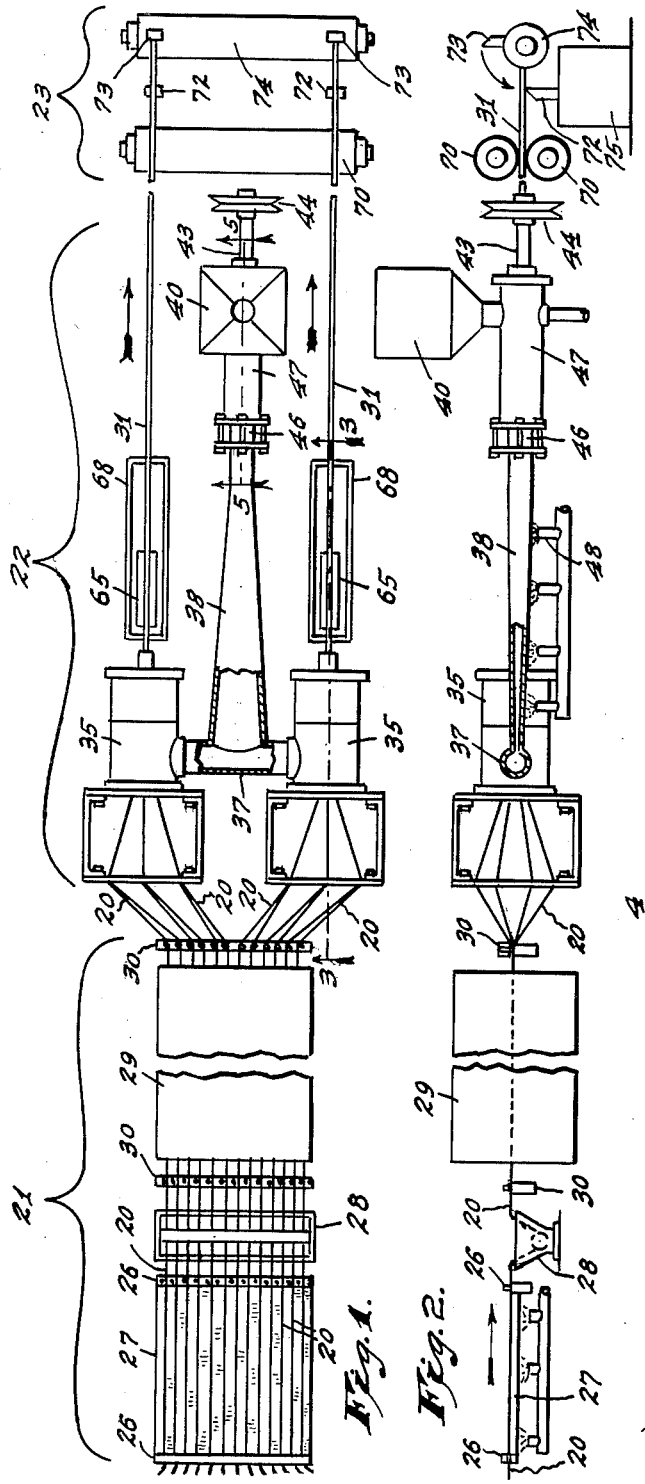

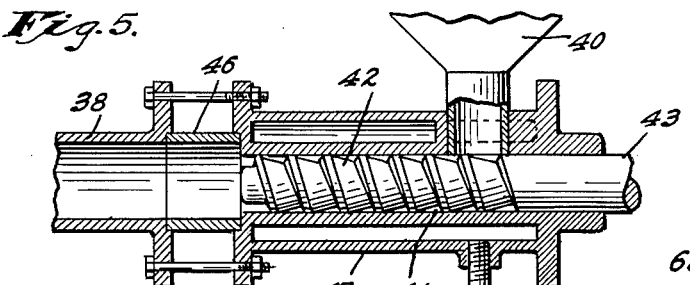
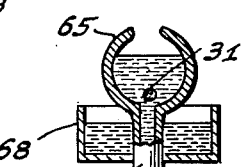
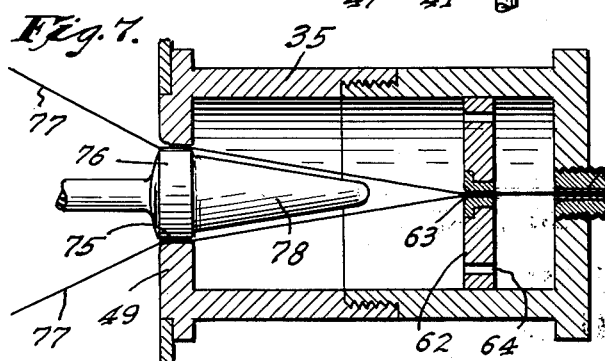
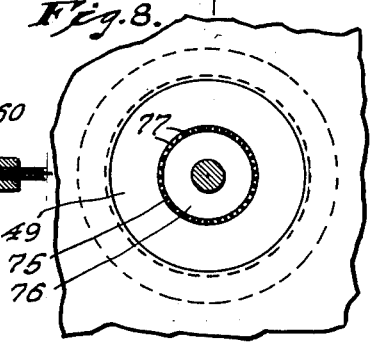
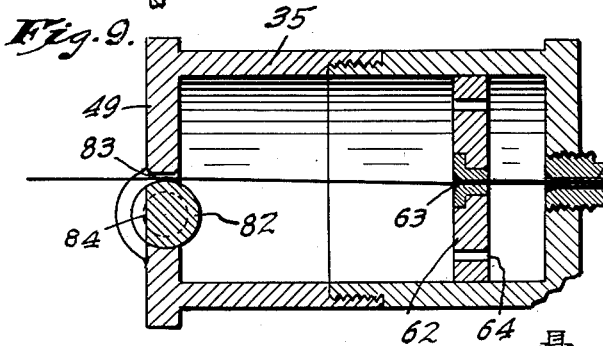
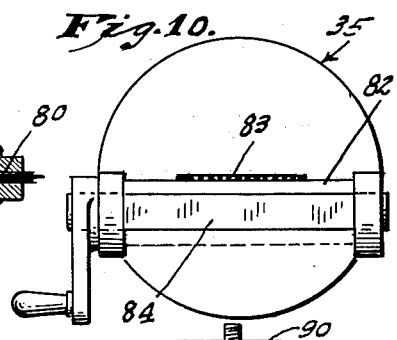
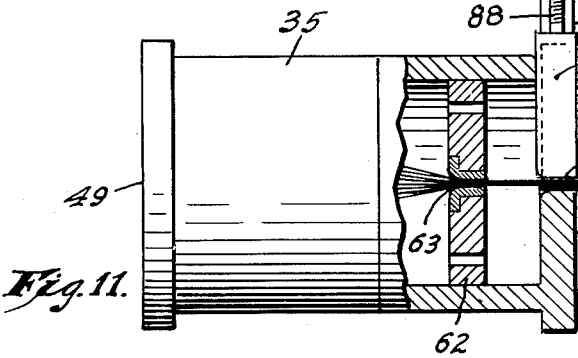
INVENTOR.
REXFORD BRADT,
BY
Schley Frank & Jenkins
ATTORNEYS.

R. BRADT 3,042,570

APPARATUS AND METHOD FOR PRODUCING
REINFORCED MOLDING COMPOSITION

Filed Feb. 20, 1958

INVENTOR.
REXFORD BRADT,
BY
*Schley Roehr & Jenkins*
ATTORNEYS.

United States Patent Office 3,042,570
Patented July 3, 1962

3,042,570
APPARATUS AND METHOD FOR PRODUCING
REINFORCED MOLDING COMPOSITION
Rexford Bradt, Warsaw, Ind., assignor to Fiberfil Corporation, Warsaw, Ind., a corporation of Indiana
Filed Feb. 20, 1958, Ser. No. 716,393
16 Claims. (Cl. 156—180)

This invention relates to the manufacture of reinforced, synthetic injection-molding compositions in the form of granules or pellets each comprising a bundle of generally aligned threads of glass or other reinforcing material impregnated and surrounded by a thermoplastic synthetic resin. In my prior application, Serial No. 327,935, filed December 24, 1952, now Patent No. 2,877,501, issued March 17, 1959, I disclosed a method of producing such compounds wherein continuous strands of glass roving or similar material are passed through a dispersion of the synthetic resin, are heated to cure the resin, and are then cut into pellets or granules of the desired length, usually about ½ of an inch. The present invention is particularly directed to the production of such an injection-molding material embodying a synthetic resin which does not lend itself to dispersion in any form.

In carrying out the invention in the preferred manner, continuous lengths of glass roving or other desired reinforcing material are passed through a bath of melted thermoplastic synthetic resin, are then cooled to solidify the resin, and are finally cut into pellets of the desired length. The impregnating and coating bath of molten thermoplastic is maintained under controlled pressure, the roving entering and leaving it through small orifices and the speed of the roving being so coordinated with the pressure and fluidity of the resin as to prevent escape of the melted resin at the entering orifice and to insure that no objectionable excess of the resin emerges with the roving from the discharge orifice. The container for the melted plastic desirably embodies an elongated heating chamber which is insulated from the feeding mechanism, whereby the feeding mechanism, which generates and maintains the pressure existing within the melted plastic, operates on unmelted, solid granules of the resin. Within each coating and impregnating chamber there is a guide means which guides the strand of roving to insure that it will be located approximately centrally within its enclosing sheath of resin. Other features of the invention will become apparent as the more detailed description proceeds.

In the accompanying drawings, which illustrate a preferred embodiment of the invention:

FIG. 1 is a plan view in partial section, somewhat diagrammatic in character, illustrating the complete treating apparatus;

FIG. 2 is a side elevation in partial section, also somewhat diagrammatic in character, of the apparatus shown in plan in FIG. 1;

FIG. 3 is a vertical section, on an enlarged scale, on the line 3—3 of FIG. 1;

FIG. 4 is a section on the line 4—4 of FIG. 3;

FIG. 5 is a vertical section through the feeding mechanism on the line 5—5 of FIG. 1;

FIG. 6 is a section on the line 6—6 of FIG. 3;

FIG. 7 is a view similar to FIG. 3 showing a modified form of treating chamber;

FIG. 8 is an elevation of the front end of the chamber shown in FIG. 7;

FIG. 9 is a view similar to FIGS. 3 and 7 showing another form of treating chamber;

FIG. 10 is an elevation of the front end of the chamber shown in FIG. 9;

FIG. 11 is a side elevation in partial section of a treating chamber showing an adjustable means for regulating the proportion of resin to reinforcement in the finished product;

FIG. 12 is a rear end elevation of the chamber shown in FIG. 11;

Figure 13:
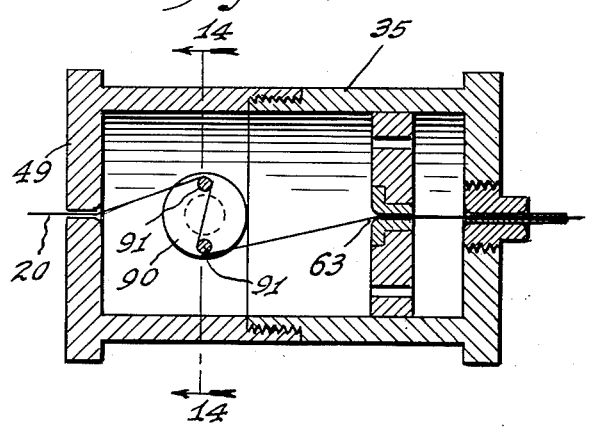
FIG. 13 is an axial section through a treating chamber embodying a device for working the reinforcing material.

In the apparatus shown in its entirety in FIGS. 1 and 2, lengths 20 of the reinforcing material to be treated pass successively through a pretreating section 21, a coating section 22, and a feeding and cutting section 23. The reinforcing material may be glass or other appropriate filamentary filler, and each length may contain any number of individual filaments or groups of filaments, twisted or untwisted. Such lengths will hereinafter be referred to, without limitation, as strands. In the pretreating section 21 the strands 20, coming from cops or creels (not shown) are fed through spaced guides 26 between which they pass in contact with a plate 27 heated by any appropriate means to a temperature such as to burn from the strands any sizing they may contain. If, as is usually desired, the strands are to receive a new coating of sizing before being impregnated and coated with the molding resin, such new size coating may be applied by passing the strands through a bath 28 and then through an oven 29 to set the size. Guides 30 located at the entrance and exit of the oven 29 support the strands for passage through the oven and maintain the respective strands in spaced relation with respect to each other.

Leaving the last of the guides 30, the strands pass into the coating section 22 illustrated in FIGS. 3 and 4. As shown, twelve strands 20 are fed to the apparatus and, before being coated with the molding resin, are divided into two groups of six; and within the coating apparatus, the six strands of each group are combined to form a single bundle 31 of the coated material.

The coating and impregnating apparatus includes two chambers 35 each of which receives one group of six strands to be coated. As shown, the chambers 35 are generally cylindrical, disposed in parallel relation, and interconnected by a feed conduit 37 which, at an intermediate point, receives melted resin from an elongated heating chamber 38. The inlet end of the heating chamber 38 receives the molding resin from feeding mechanism including a hopper 40 which discharges the molding resin in granules to a feed chamber 41 (FIG. 5) communicating with the inlet end of the heating chamber 38. The interior of the feed chamber 41 is cylindrical and receives a feed screw 42 adapted to be rotated by any appropriate means. As shown, an unthreaded end 43 of the feed screw projects axially from the feed chamber 41 and has secured to it a pulley 44 through which it may be rotated.

As previously indicated, it is desired to maintain the feed chamber 41 at a relatively low temperature so that the granular plastic within it will remain in solid state. For this purpose, a heat-insulating sleeve 46 is interposed between the inlet end of the heating chamber 38 and the feeding chamber 41. To retard the flow of heat, the sleeve 46 is desirably formed of material of relatively low heat conductivity, and has a wall as thin as practicable. Further to prevent melting of the material in the feed chamber 41, such feed chamber may have a jacket 47 through which a liquid coolant is circulated.

Burners 48, or other appropriate heating means are associated with the heating chamber 38, the conduit 37, and the chambers 35 so that as the granular material fed by the screw 42 enters the heating chamber it will be melted and will reach the coating chamber 35 in molten state. At that end where the strands enter each coating chamber, the end wall 49 of such chamber is provided with an opening 50 having a diameter substantially less than that of the heating chamber, and slots 51, one for each of the strands 20, radiate from the opening 50. Overlying the slots 51 at the inner face of the end wall 49 is a circular member 53 mounted on a shank 54 which projects outwardly from the chamber 35 for cooperation with a spring 55 urging the member 53 into contact with the inner surface of the end wall of the heating chamber. The diameter of the member 53 is such as to leave between its periphery and the bases of the slots 51 spaces just large enough to receive respectively the strands 20. For the purpose of improving the conduction of heat to the entering strands 20, the member 53 is desirably made of metal of high heat-conductivity and has an axial projection 56 extending into the body of melted plastic within the chamber 35.

At the discharge end of the chamber 35, the end wall 59 thereof is provided with a centrally located orifice 60, desirably contained in a removable plug 61 which can be interchanged with other plugs having orifices of different diameters. Mounted within the chamber 35 in spaced relation to the orifice 60 is a stripper 62 having a circular orifice 63, which is coaxial with the orifice 60 but of smaller diameter. Openings 64 extending through the stripper provide for passage of the melted resin to the end of the chamber adjacent the orifice 60.

The individual strands 20 enter the chamber 35 at locations spaced uniformly about the periphery of member 53 and then converge to the orifice 63, through which they pass. The orifice 63 is small enough to force the strands together into a relative compact bundle which emerges from the chamber 35 through the orifice 60. Since the bundle formed by the orifice 63 is relatively compact, the strands in it will be located relatively close to or in contact with each other, and such relative disposition of the strands will be maintained as they pass outwardly through the orifice 60. Since such orifice is larger than the orifice 63, the bundle formed by the latter orifice will emerge from the orifice 60 with a concentric sheath of the melted resin.

The single coated bundle of roving emerging from each of the coating chambers 35 is cooled to solidify the melted resin with which the bundle is impregnated and sheathed. Conveniently, the cooling means embodies an open-ended trough 65 which is connected to and supported by a pipe 67 through which cooling water is supplied, the coated bundle of roving passes through the trough in contact with water supplied through the pipe 67. Water running from the ends of the trough 65 and dripping from the bundle of roving may be collected in a second trough 68 and removed.

The cooled bundle of roving next passes between two power-driven feed rolls 70 through the action of which the roving is drawn through the whole apparatus. The rolls 70 may be faced with rubber or other compressible material to grip the coated bundles of roving firmly and to exert thereon the clamping pressure necessary for the feeding action. The rolls 70 may be located a substantial distance from the trough 65 to provide a substantial length of coating roving exposed to the cooling effect of the atmosphere.

Beyond the feed rolls 70, I locate means for cutting the bundles of roving into predetermined lengths. As shown, such means comprises a stationary blade 72 co-operating with a blade 73 carried by a rotatable power-driven drum 74. As the drum 74 rotates, the coated bundles of roving passing across the face of the stationary blade 72 are sheared into short lengths which fall into a bin 75. The length of the pellets or granules into which the coated roving is cut can be controlled by adjusting the speed of the drum 74 relative to the peripheral speed of the rolls 70.

In setting up the apparatus for operation, individual strands 20 of roving are passed through the guides 26, trough 28 and guides 30 and into the coating chamber 38 through the slots 51 in the end wall thereof. Preferably, each chamber 35 is made, as shown, in two axially separable parts, one containing the member 53 and connected to the conduit 37 and the other containing the stripper 62 and discharge orifice 60. In setting up the apparatus, the end of the heating chamber containing the stripper 62 and discharge orifice is removed from the other end to facilitate drawing the strands through the slots 51. This operation may be further facilitated by urging the member 53 inwardly of the heating chamber against the action of the spring 55 to expose the entire radial extent of each slot 51. After the individual strands are passed through the slots 51, they are gathered and passed through the orifices 63 and 60, and the removable end of the heating chamber 35 is then replaced. Beyond the heating chamber the gathered bundles of strands are laid in the troughs 65 and passed between the feed rolls 70.

After the strands have been led completely through the apparatus and between the feed rolls 70, the burners 48 are placed in operation to heat the heating chamber 38, the conduit 37, and the coating chambers 35, and rotation of the feed screw 42 is started to feed the resin into the heating chamber 38 and therethrough into the coating chambers. When the resin thus introduced has been liquefied, the rollers 70 are placed into operation drawing the strands 20 across the plate 27 and through the sizing bath 28, oven 29 and coating chambers 35. When coated material reaches the knife 72 the drum 74 is placed in operation.

The pretreating section 21 of the apparatus may or may not be used, depending upon whether or not the strands 20 in their original state require any pretreatment to effect the desired bond between them and the molding resin. In some instances, it may be satisfactory to apply sizing to the strands in their original state, in which event the plate 27 may be eliminated. In other instances, it may be desired to apply two or more coatings of size, perhaps of different characteristics; and in such event additional coating troughs and drying ovens may be interposed between the oven 29 and the coating chambers 35.

The sizing applied to the strands in a pretreating operation is conveniently applied as a solution or emulsion of the sizing material. Suitable sizing materials include polyvinyl acetate with or without chromium compounds, silanes, and other bonding materials adherent to the glass and also adherent, preferably reactively, to the resin.

The materials employed for coating the sized strands and supplied to the hopper 40 may be such synthetic thermoplastic resins as nylon, polystyrene, polyethylene, plasticized polyvinyl chloride, and cellulose esters.

The orifices defined at the base of the slots 51 by the member 53 are somewhat larger than a compacted strand; and as a result, the melted resin within each coating chamber 35 tends to escape under the pressure generated in the coating chamber by operation of the feed screw 42. However, the molten resin is relatively viscous and its escape is opposed by friction with the entering strand of roving. No difficulty has been experienced in practice in moving the strands through the apparatus at such a rate as to prevent any substantial escape of the melted resin through the slots 51. In other words, the normal velocity of escape of the melted plastic through the slots 51 is less than the velocity of the strands entering the coating chamber. At the discharge end of each coating chamber, the movement of the strand aids the flow of the molten resin through the orifice 60; but all such escaping material remains, as is desired, in the form of a sheath on the bundle of strands.

Should a strand break, it is not necessary to interrupt operation of the apparatus to replace it. In the event of breakage, the cop end of the broken strand is tied to an adjacent strand and is drawn with the adjacent strand through the apparatus. The guides 26 and 30 desirably have open-ended slots in which the strands are received, so that after the knot has passed any guide, the broken strand can be moved to its proper slot. The slots 51 at the entrance to the coating chambers are wide enough to pass knotted strands; and the member 53 can, if necessary, move inwardly to permit a knot to pass into the coating chamber. After the knot has passed, two strands will be located in a single slot 51 and an adjacent slot will be empty. By forcing the member 53 inwardly to expose the open ends of the slots 51, the broken strand can be placed in its proper slot and thereafter operation of the apparatus can continue in normal fashion.

As previously noted, the particular apparatus illustrated in the drawing contemplates the simultaneous production of two bundles of coated roving with each bundle comprising six strands 20. Strands I have used in practice contain twenty glass-fiber ends, with each end comprising 204 individual threads or monofilaments. With such material used, the orifice 63 in the stripper 62 may have a diameter of about 0.113 inch. The proportion of molding resin to filler in the finished product is controlled in part by the size of the opening 60, which determines the diameter of the sheath on the strand-bundle. Using six strands of the roving described for each bundle, an opening 60 of 0.147 inch in diameter will provide a material containing about 30% by weight of fiber-glass filler and highly suitable for use in injection molding machines. It will be understood that these specific orifice-sizes are set forth merely by way of example.

In FIGS. 7 and 8 I have illustrated a modified arrangement for guiding individual ends of fillers into the coating chamber 35. In this arrangement, the end wall 49 of the coating chamber is provided with a relatively large circular opening 75 in which a plug 76 is centrally mounted to define an annular orifice having a radial width approximately equal to the diameter of the ends 77 of the filler. The diameter of the opening 75 is such that the annular orifice will be substantially filled by the individual filler-ends. As in the case of the member 53, and for the same purpose, the plug 76 may have an extension 78 projecting into the body of the melted resin within the chamber 35. This arrangement has the advantage over that shown in FIGS. 3 and 4 in that substantially the entire circumference of each individual filler-end is exposed to the melted resin and hence a more uniform distribution of the melted resin within the gathered bundle of filler-ends is obtained.

In the arrangements so far described, the coated bundle of strands or filler-ends emerging from the coating chamber is generally circular in cross-section and remains generally circular as it cools. However, the cross-section may be made of any shape desired by suitably forming the outlet opening from the chamber 35. In certain instances, for example, it may be desired that the material emerge from the coating chamber as a flat ribbon rather than as a substantially circular bundle. In such event, the coating chamber may be provided with an outlet orifice in the form of an elongated slot 80 having dimensions corresponding to the cross-sectional dimensions of the desired ribbon.

Where the coating strands are to be gathered as a ribbon rather than a bundle of generally circular cross-sections, the strand-guiding means at the entrance to each chamber 35 may take the form illustrated in FIGS. 9 and 10. Here, the end wall 49 of the coating chamber is provided with an elongated slot of substantial width and the opposed side walls of such slot are given an arcuate shape conforming to the outer surface of a cylindrical member 82 rotatably mounted in the slot. One side of the slot is provided with a series of notches 83 for reception of the strands or roving fed into the coating chamber. To permit a broken strand fed through one of the notches 83 with the strand to which it is attached to be transferred to the adjacent slot 83, the member 82 is provided with a flat 84 which normally lies out of association with the side walls of the slot but which, by rotation of the member 82, can be brought into a position opposite the notches 83 to permit a strand to be moved from one notch to another.

In FIGS. 11 and 12 I have illustrated means whereby the proportion of resin to filler in the finished product can be varied while the apparatus is in operation. As there shown, the end wall 59 of each coating chamber 35 is provided with a slot 85 which extends radially from near the axis of the chamber 35 to the periphery thereof. A closure 86 fits such slot and is guided for radial sliding movement therein by a retainer 87. Beyond the outer end of the slot 85, the closure is secured to a screw-threaded shank 88 which projects outwardly through a stationary yoke 89. A nut 90 mounted on the threads of the shank 88 is located axially of itself by the yoke 89, so that, by rotation of the nut, the closure 86 can be moved to vary the effective area of the slot 85.

Figure 14:
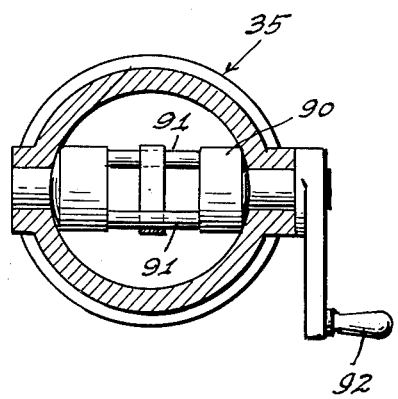
FIG. 14 is a transverse section on the line 14—14 of FIG. 13.

In all the coating chambers so far described the paths followed by the strands passing through the coating chamber are essentially straight and such flexing as the strands sustain results only from the gathering action of the stripper orifice 63. Tension in the strands tends to hold the individual components thereof together and the arrangement of those components within each strand remains substantially unchanged. In some cases it may be desirable to work or flex the strands as they pass through the molten resin in the coating chamber in order to vary the extent to which such resin penetrates the strands. An arrangement for so working the strands is illustrated in FIGS. 13 and 14. As there shown, a rotatably adjustable element 90 extends diametrically across the chamber 35 in advance of the stripper orifice 63, such element including a pair of spaced, parallel pins 91 between which the strands pass. By rotatably adjusting the element 90 about its axis, the extent to which the strands are flexed and flattened as they pass over the pins 91 can be varied as desired. To provide for adjustment of the element 90 one of its ends may extend through the wall of the chamber 35 and be provided with a handle 92 with which any appropriate form of locking or clamping means (not shown) may be associated to maintain the element in adjusted position.

I claim as my invention:

1. In apparatus for impregnating and coating a plurality of strands of filamentary material with a thermoplastic resin and for combining such strands into a bundle, a coating chamber having an inlet opening for the strands and an outlet opening for the bundle, means for maintaining said chamber filled with a molten thermoplastic to a level above said openings, means at said inlet opening for arranging in predetermined relation strands entering said chamber, said arranging means including an element which with the entering strands substantially closes the inlet opening to inhibit the escape of molten plastic therethrough, said element being of heat-conductive material and in heat-receiving contact with the molten thermoplastic, a gathering and stripping orifice receiving the strands and located in alignment with the outlet opening and intermediate the length of the chamber whereby the strands will be exposed to the molten thermoplastic both before and after their passage through the orifice, and means for drawing the strands through the chamber.

2. Apparatus as set forth in claim 1 with the addition that said gathering and stripping orifice is smaller than the outlet opening.

3. Apparatus as set forth in claim 1 with the addition of means for varying the size of said outlet opening.

4. Apparatus as set forth in claim 1 with the addition of means located in advance of said coating chamber for removing sizing from said strands.

5. Apparatus as set forth in claim 1 with the addition of a liquid bath of strand-coating material, and means for guiding the strands through said bath prior to passing into the coating chamber.

6. In apparatus for impregnating and coating strands of filamentary material with a thermoplastic resin, a coating chamber having inlet and outlet openings for the strands, said chamber having an end wall containing said inlet opening and provided with an annular series of slots radiating from the inlet opening, each of said slots being adapted to receive an individual strand of the filamentary material, a plug member having within said chamber an annular portion overlapping the inner ends of the slots to confine the strands to the base portions thereof, said plug member being displaceable inwardly of the chamber to open the inner ends of the slots and permit the transfer of a strand from one slot to another, means for maintaining a supply of molten thermoplastic under pressure in said chamber, and means for drawing the strands through said chamber.

7. In apparatus for impregnating and coating strands of filamentary material with a thermoplastic resin, a coating chamber having inlet and outlet openings for the strands, a plug member located in and of smaller diameter than said inlet opening to define an annular space substantially filled by said strands, means for maintaining a supply of molten thermoplastic under pressure in said chamber, and means for drawing the strands through said chamber.

8. In apparatus for impregnating and coating strands of filamentary material with a thermoplastic resin, a coating chamber having inlet and outlet openings for the strands, said inlet opening being an elongated slot having a series of spaced strand-receiving orifices in one of its walls, a member movable between two positions in one of which it closes the open ends of said notches and in the other of which it opens the notches to permit the transfer of a strand from one notch to another, means for maintaining a supply of molten thermoplastic under pressure in said chamber, and means for drawing the strands through said chamber.

9. In apparatus for impregnating and coating strands of filamentary material with a thermoplastic resin, a coating chamber having inlet and outlet openings for the strands, adjustable means located in said chamber and engageable with said strands to flex them as they pass through said chamber, means for maintaining a supply of molten thermoplastic under pressure in said chamber, and means for drawing the strands through said chamber.

10. In apparatus for impregnating and coating strands of filamentary material with a thermoplastic resin, a coating chamber having inlet and outlet openings for the strands, means for drawing the strands through said coating chamber, an elongated melting chamber having an outlet end communicating with said coating chamber, a power operated feeding device located wholly exteriorly of said chamber for forcing solid thermoplastic resin into the other end of said melting chamber to maintain a substantial fluid pressure in said chambers, means for heating said melting chamber, and a heat-insulating sleeve located between the feeding device and melting chamber to provide a passage for resin forced into the melting chamber from the feeding device while retarding the conduction of heat from the melting chamber to the feeding device.

11. Apparatus as set forth in claim 10 with the addition that said sleeve and the adjacent end of the melting chamber are of substantially circular cross-section, the cross-sectional shape of the melting chamber progressively decreasing in one dimension and increasing in the other toward said outlet end.

12. Means for providing a supply of melted thermoplastic resin under pressure, comprising an elongated melting chamber having an inlet at one end and an outlet at the other, a power operated feeding device located wholly exteriorly of said chamber for forcing solid thermoplastic resin into the other end of said melting chamber, to maintain a substantial fluid pressure in said melting chamber, means for heating said melting chamber, and a heat-insulating sleeve located between the feeding device and melting chamber to provide a passage for resin forced into the melting chamber from the feeding device while retarding the conduction of heat from the melting chamber to the feeding device.

13. Apparatus as set forth in claim 12 with the addition that said sleeve and the adjacent end of the melting chamber are of substantially circular cross-section, the cross-sectional shape of the melting chamber progressively decreasing in one dimension and increasing in the other toward said outlet end.

14. The invention set forth in claim 12 with the addition that said feeding device comprises a rotatable feed screw coaxial with said sleeve.

15. A method for impregnating and coating a plurality of strands of filamentary material, comprising drawing the strands through inlet and outlet openings of a coating chamber containing a supply of melted thermoplastic resin under pressure, and compressing the strands into a bundle, said step of compressing the strands into a bundle being performed at a point intermediate the path of strand movement through the coating chamber, whereby the strands will be exposed to contact with the melted resin both before and after their compression into a bundle, at a point between said openings to a cross-sectional area less than that of said outlet opening, the drawing of the strands through said inlet and outlet openings being at such a speed as to inhibit the emission of melted resin through said inlet opening under the pressure to which the resin is subjected.

16. In apparatus for impregnating and coating strands of filamentary material with a thermoplastic resin, a coating chamber having inlet and outlet openings for the strands, a gathering and stripping orifice located in said chamber in alignment with and spaced from the outlet opening, means for maintaining a supply of molten thermoplastic under pressure in said chamber, said gathering and stripping orifice being located intermediate the length of said chamber whereby said strands will be exposed to the molten thermoplastic both before and after their passage through it, and means for drawing the strands through said coating chamber, said means for maintaining a supply of molten thermoplastic under pressure in said coating chamber comprising an elongated melting chamber having an outlet end communicating with said coating chamber, a power operated feeding device located wholly exteriorly of said chamber for forcing solid thermoplastic resin into the other end of said melting chamber, to maintain a substantial fluid pressure in said chambers, a heat-insulating sleeve located between the feeding device and melting chamber and providing a passage for resin forced into the melting chamber from the feeding device, and means for heating the melting chamber.

References Cited in the file of this patent

UNITED STATES PATENTS

| 1,454,224 | Schmidt | May 8, 1923 |
| 1,797,249 | Truesdale | Mar. 24, 1931 |
| 2,255,436 | Olson | Sept. 9, 1941 |
| 2,404,406 | Roddy | July 23, 1946 |
| 2,482,071 | Simison | Sept. 13, 1949 |
| 2,543,027 | Jones | Feb. 27, 1951 |
| 2,629,894 | Boggs | Mar. 3, 1953 |
| 2,633,428 | Klug | Mar. 31, 1953 |
| 2,647,296 | Shive | Aug. 4, 1953 |
| 2,682,292 | Nagin | June 29, 1954 |
| 2,694,661 | Meyer | Nov. 16, 1954 |
| 2,763,629 | Gottfurcht | Sept. 18, 1956 |
| 2,782,833 | Rusch | Feb. 26, 1957 |
| 2,816,595 | Hudak | Dec. 17, 1957 |
| 2,844,487 | Waller et al. | July 22, 1958 |